Nov. 20, 1934.　　　　G. B. STARIE　　　　1,981,528
SYSTEM OF MOTOR CONTROL
Filed Nov. 19, 1932
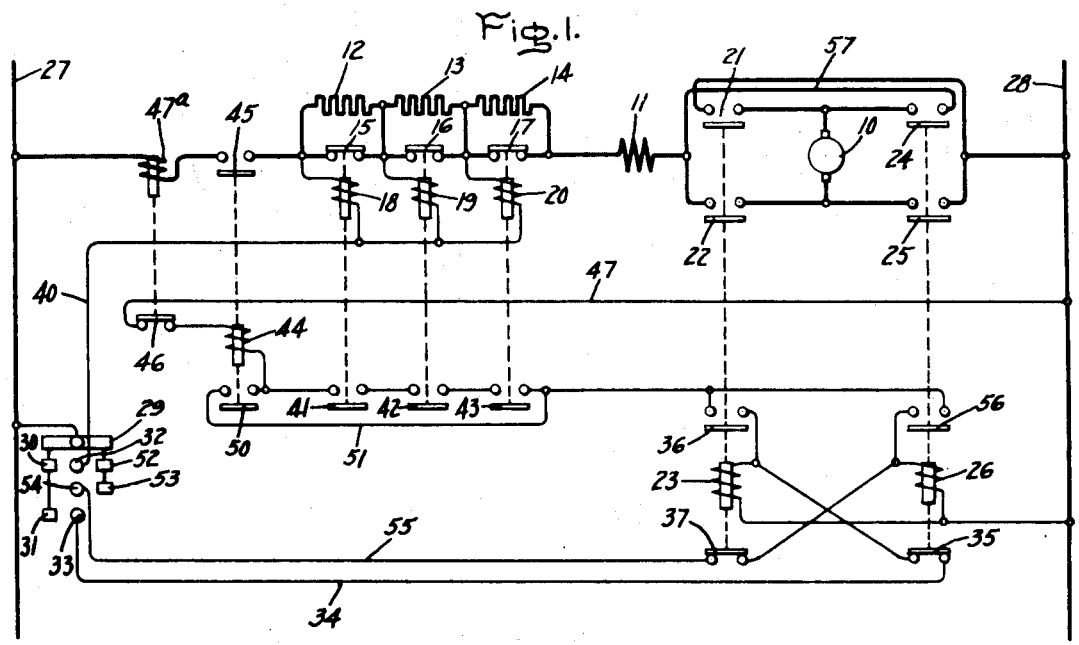
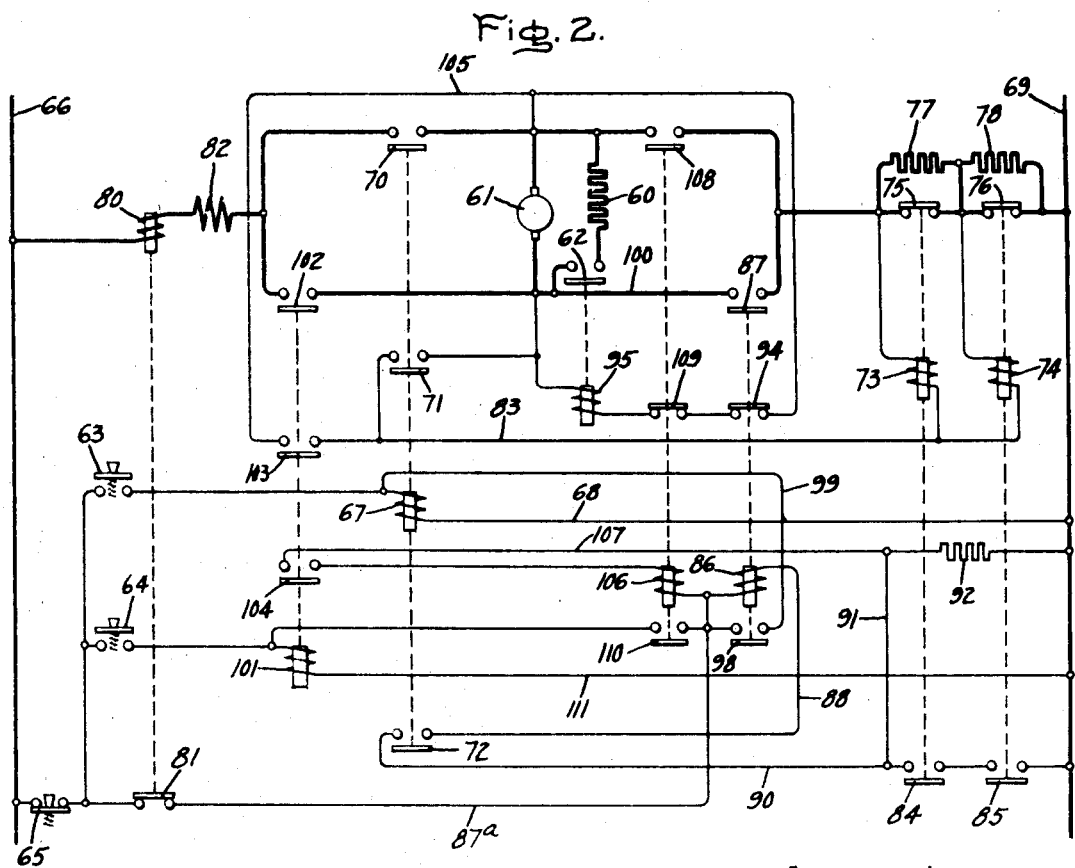
Inventor:
George B. Starie,
by Chas. E. Mullan
His Attorney.

Patented Nov. 20, 1934

1,981,528

UNITED STATES PATENT OFFICE 1,981,528

SYSTEM OF MOTOR CONTROL

George B. Starie, Schenectady, N. Y., assignor to General Electric Company, a corporation of New York Application November 19, 1932, Serial No. 643,413

4 Claims. (Cl. 172—288)

My invention relates to systems of motor control, more particularly to automatic starting systems for electric motors, and has for its object the provision of a simple and reliable system of this kind.

More particularly my invention has for its object a motor control system utilizing the inductive effect of the windings for operating the accelerating switches to give a time interval in their operation, together with a simplified system wherein these switches perform the actual control operations in the motor circuit.

In carrying out my invention in one form, I utilize a starting switch together with one or more accelerating switches which operate in sequence in the order mentioned, together with means for energizing the windings of the accelerating switches to move them to a predetermined position, means responsive to this movement for operating the starting switch and connections whereby the operation of the starting switch short-circuits the winding of the next accelerating switch which thereupon moves to its biased position after a predetermined time interval determined by the inductive effect of its winding.

For a more complete understanding of my invention reference should be had to the accompanying drawing, Fig. 1 of which shows in diagrammatic form a system of motor control embodying my invention, while Fig. 2 is a diagrammatic view showing a modified form of my invention in which a dynamic braking switch is provided.

Referring to the drawing, I have shown my invention in one form as applied to the operation of a direct current motor 10 provided with a series field winding 11, such as may be used in the driving of steel mill equipment. The motor is started with starting resistances 12, 13 and 14 included in circuit with its armature 10 and field 11, these resistances being respectively short-circuited in sequence in the order mentioned by means of switches 15, 16 and 17. The switches 15, 16 and 17 are normally closed and may be suitably biased to their closed positions by gravity as indicated in the drawing or by means of springs. They may be operated to their open position by means of windings 18, 19 and 20. Reversing switches 21, 22 operated by a winding 23 are provided for energizing the armature 10 of the motor for operation in one direction while similar reversing switches 24 and 25 operated by a winding 26 close the circuit through the armature for reversed current flow to give the opposite rotation. Current is supplied to the motor from suitable direct current supply means 27 and 28 while the starting and stopping of the motor and its direction of rotation are controlled by a manually operated controller 29 of a well known drum type.

In the operation of the system the controller 29 is turned to give the desired direction of rotation. Assuming that it is turned in a direction to bring the movable segments 30 and 31 into engagement with the stationary contacts 32 and 33, respectively, a circuit is first established from the supply main 27 through the controller 29, conductor 34, a normally closed interlock switch 35, operated with the switches 24 and 25, thence through the operating winding 23 to the supply source 28. This energization of the winding 23 picks up and closes the switches 21 and 22 and also closes an interlock switch 36, as well as opening an interlock switch 37 to assure that the winding 26 cannot be energized until the winding 23 has been deenergized. The closing of the switches 21 and 22 establishes circuits for the operating windings 18, 19 and 20 in parallel, this circuit leading from the controller 29 through the conductor 40, in coils in parallel, thence to the terminals of the resistances 12 and 13, respectively, as shown and through the particular resistances and the resistance 14, the winding 11, switch 22, armature 10, switch 21 to the supply main 28. The energization of these windings opens the switches 15, 16 and 17, thus inserting the sections of the starting resistance in the motor circuit.

Concurrently with the opening of the switches 15, 16 and 17, the interlock switches 41, 42 and 43 are closed respectively by them. The closing of these switches closes a circuit for the operating winding 44 of the starting switch 45, this circuit leading from the supply main 27 as previously traced through the switch 36, the three switches 41, 42 and 43, the winding 44, an overload protective switch 46 and the conductor 47 to the supply main 28. The resultant closing of the starting switch 45 by the winding 44 completes the circuit for the motor, this circuit leading from the supply conductor 27 through the operating winding 47a of the overload switch 46, the switch 45, the starting resistance sections 12, 13 and 14, the field winding 11 and thence through the reversing switches 21 and 22 and the armature 10 to the supply main 28 as previously traced.

In order to assure the sequence closing of the switches 15, 16 and 17 in the order mentioned with a predetermined time interval between the closing of switch 45 and switch 15 and also between the switches 15, 16 and 16, 17 the connections for the windings 18, 19 and 20 are arranged to be commutated by the closing of the preceding switch so as to introduce these time intervals by reason of the self induction of the windings. As shown, the connections are so arranged that the preceding switch when closing short circuits the winding of the next switch. When the switch 45 closes to start the motor it will be observed that a short circuit is closed for the winding 18, this circuit extending from the upper terminal of this winding through the switch 45, the coil 47a to the supply conductor 27 thence through the conductor and the controller 29 and the conductor 40 to the lower terminal of the windings. The winding 18 is so arranged with respect to its number of turns, resistance and its relation to its armature that the winding when short-circuited holds the switch 15 open by its self induction for a predetermined time interval, such as several seconds, after which the force exerted by the winding on its armature tending to hold the switch open has decreased to such a point that it is overcome by the biasing force of the switch and the switch therefor closes, short-circuiting the starting resistance 12. When the switch 15 closes it will be observed that a short circuit is closed for the winding 19, this circuit leading from the upper terminal of the winding through the switches 15 and 45, coil 47a, conductor 27, controller 29 and conductor 40 to the lower terminal of the winding 19. Therefore after a predetermined time interval, during which the motor accelerates to a higher speed, and for which time interval the winding 19 is designed, the switch 16 closes to short-circuit the resistance section 13 and accelerate the motor to a still higher speed. The closing of the switch 16 in turn closes a short circuit for the winding 20 through the switches 16, 15 and 45, coil 47a, conductor 27, controller 29, and the conductor 40. The switch 17 is held open by reason of the inductive effect of the winding 20 for a predetermined interval after it closes and short-circuits the resistance section 14. The motor thereupon continues its acceleration to its full speed.

The closing of the starting switch 45 also closes an interlock switch 50 connected thereto which switch closes a holding circuit for the coil 44 around the interlock switches 41, 42 and 43, this holding circuit being through the conductor 51 and the switch 50 to the winding 44. By reason of this holding circuit the coil 44 remains energized when the switches 41, 42 and 43 open concurrently with the closing of the switches 15, 16 and 17.

In order to stop the motor the controller 29 is returned to the off position as shown in the drawing which disengages the segment 31 from the stationary contact 33 thus opening the circuit through the winding 23 and the winding 44. The reversing switches 21 and 22 thereupon drop out and also the starting switch 45.

The operation of the motor for the opposite direction of rotation will be easily understood from the following description: For reverse rotation the controller is thrown to bring the movable segment 52 into engagement with the stationary segment 32 and the movable segment 53 into engagement with the stationary segment 54. Engagement of the segment 53 with the contact 54 closes the circuit through the conductor 55, the interlock switch 37 which is now closed and the coil 26 to the supply main 28. This energization of the winding 26 closes the reversing switches 24 and 25 and opens the interlock switch 35 in addition to closing the interlock switch 56. The closing of the switches 24 and 25 completes the circuit for the three windings 18, 19 and 20 in parallel. This circuit leads through the controller 29 through segment 52 and the contact 32, the conductor 40, the windings as previously traced, the field winding 11, the conductor 57, the reversing switch 24, the armature of the motor 10, the reversing switch 25 to the supply main 28. The windings 18, 19 and 20 thereupon respectively open the switches 15, 16 and 17 and close the switches 41, 42 and 43 and from this point the acceleration of the motor takes place in the manner previously described, the starting switch 45 first closing to establish the motor circuit and thereupon the switches 15, 16 and 17 closing in sequence.

In Fig. 2 is shown a modified form of my invention utilizing push buttons to start and stop the motor and also a dynamic braking resistor 60 which is automatically connected across the armature 61 of the motor by means of a switch 62. In this form also the reversing switches serve as starting switches.

In the operation of this system the normally open push buttons 63 and 64 are utilized to start the motor in the desired direction while the normally closed push button 65 is utilized to stop the motor. When the push button 63 is depressed it establishes a circuit from the supply conductor 66 through the stop switch 65, the switch 63, the winding 67 and the conductor 68 to the supply main 69. This energizes the winding 67 which picks up its armature to close the reversing switch 70 in the motor circuit and the interlock switches 71 and 72. The closing of the interlock switch 71 establishes a circuit for the two windings 73 and 74 of the accelerating switches 75 and 76 whereby these switches are opened to insert the starting resistance sections 77 and 78 into the motor circuit. This circuit for the coils 73 and 74 may be traced from the supply main 66 through the winding 80 of the overload protective switch 81, the series field 82 of the motor, the switch 70, the armature 61 of the motor, switch 71 and conductor 83 to the coils and thence through the coils to the sections of the resistance and to the opposite supply main 69. The windings 73 and 74 also close respectively the interlock switches 84 and 85 which complete a circuit for the operating winding 86 of the reversing switch 87 in the motor circuit. This circuit leads from the supply main 66 through the stop push button 65, the overload relay 81, the conductor 87a, the winding 86, the conductor 88, the interlock switch 72 which is now closed, conductor 90, and the two switches 84 and 85 to the supply main 69. The holding circuit for the winding 86 is maintained there through the conductor 91 and the resistance 92 to the supply main 69, the resistance 92 being of such value as to prevent sufficient energization of the winding 86 to close the switch 87 but permitting sufficient energization to hold the switch closed after it has once been closed.

The closing of the reversing switch 87 completes the circuit for the motor, this circuit leading from the supply main 66 through the winding 80, the field 82, the switch 70, armature 61, switch 87 and the resistances 77 and 78 to the supply main 69. The motor thereupon starts and accelerates to the low running speed. The closing of the switch 87 also opens a normally closed switch 94 in the circuit of the winding 95 for the normally open dynamic braking switch 62 thus preventing energization of the winding 95 by the counter E. M. F. of the motor armature after the motor comes up to speed. Furthermore, the winding 86 also closes an interlock switch 98 which establishes a holding circuit for the winding 67 in shunt to the push button 63 which may now be released. This holding circuit extends from the conductor 87a through the switch 98, the conductor 99, and the winding 67 and conductor 68 to the supply main 69.

Furthermore, the closing of the reversing switch 87 establishes a short circuit for the operating winding 73, this circuit leading from the upper terminal of the winding 73 through the switch 87, the conductor 100, switch 71, and the conductor 83 back to the lower terminal of the winding. The winding 73 thereupon holds the switch 75 open for a predetermined interval by reason of its self induction after which the switch 75 closes to short-circuit the resistance 77 and at the same time short-circuits the winding 74 which in turn closes after a predetermined time interval as will be understood from the description in connection with Fig. 1. The motor is now running at full speed and it may be stopped at any time by pressing the stop button 65 which opens the control circuit allowing the reversing switches to drop out.

For the opposite direction of rotation of the motor, the push button 64 is pressed whereby the winding 101 is energized to close the reversing switch 102 and also the interlock switches 103 and 104. The closing of the switch 103 establishes a circuit for the two windings 73 and 74, this circuit leading from the supply main 66 through the winding 80, the field winding 82, switch 102, armature 61, conductor 105, switch 103 and conductor 83 to the winding and thence through the resistance sections to the supply main 69. The windings 73 and 74 thereupon open the switches 75 and 76 and in so doing close their interlock switches 84 and 85 which establish a circuit for the winding 106, this circuit leading from the conductor 87a through the winding, interlock switch 104, the conductor 107, conductor 91, and the switches 84 and 85 to the supply main 69. The energization of the winding 106 closes a reversing switch 108 which completes the circuit of the motor, opens a normally closed interlock switch 109 in the dynamic braking control circuit and closes an interlock switch 110 which establishes a holding circuit for the winding 101 from the conductor 87a through the switch 110, the winding 101, and conductor 111 to the supply main 69. Upon the closing of this holding circuit the button 64 may be released.

A short circuit for the winding 73 is also established by the closing of the reversing switch 108, this circuit leading from the upper terminal of the winding through the switch 108, the conductor 105, the interlock switch 103 and the conductor 83 back to the terminal of the winding. The accelerating switch 75 thereupon closes after a predetermined time interval determined by the self induction of the winding 73 thus short-circuiting the starting resistance 77. After a predetermined time interval the switch 76 closes to complete the starting of the motor as previously described in connection with the opposite direction of rotation.

When the motor is stopped as by the pressing of the push button 65 all of the reversing switches, of course, drop open with the result that the switches 109 and 94 are both closed and connect the winding 95 directly across the motor armature. The winding 95 is thereupon energized by the counter E. M. F. of the armature and closes the switch 62 thus establishing a dynamic braking circuit for the armature through the braking resistor 60. The motor is thus brought quickly to rest, the switch 62 opening in response to the decreased energization of the winding 95. Obviously if desired the dynamic braking resistance and controls therefor may be omitted from this form of my invention.

What I claim as new and desire to secure by Letters Patent of the United States is:

1. The combination with a motor, of a starting resistance therefor, a plurality of normally closed accelerating switches for respectively short circuiting sections of said resistance, an operating winding for each of said accelerating switches arranged when short circuited to give a predetermined time interval in the closing of its respective switch, a normally open starting switch, connections for said windings whereby one of said windings is short circuited by the closing of said starting switch and another of said windings is short circuited by the closing of the accelerating switch operated by said first winding, a winding for operating said starting switch to the closed position, an interlock switch operated to its closed circuit position by the closing of each of said accelerating switches, a circuit for the winding of said starting switch including said interlock switches connected in series relation with each other and said winding, a manually operated switch in circuit with the windings of said accelerating switches for controlling the energization of said windings to open said accelerating switches whereby said interlock switches are closed to energize the winding of said starting switch, a switch closed by the closing of said starting switch for establishing a holding circuit for the winding of said starting switch, two pairs of electromagnetically operated reversing switches for controlling said motor for forward and reverse operation, manually operated switch means for selectively controlling the operation of said reversing switches for the desired direction of operation of said motor, interlock switch means operated to closed position by the closing of each pair of said reversing switches, and connections including one of said interlock switch means in the circuit of the winding of said starting switch.

2. The combination with a motor, of a starting resistance therefor, a plurality of normally closed accelerating switches for respectively short circuiting sections of said resistance, an operating winding for each of said switches arranged when short circuited to give a predetermined time interval in the closing of its respective switch, a pair of reversing switches on each side of said motor, separate operating windings for each of said reversing switches, a pair of push buttons for selectively energizing the windings of a first pair of said reversing switches for forward or reverse operation of said motor, interlock switches operated selectively by said first pair of switches for determining the winding of the reversing switch of the second pair to be energized, interlock switches operated by said first pair of reversing switches for closing a circuit for the windings of said accelerating switches to open said accelerating switches, interlock switches operated by the opening of said accelerating switches for completing the circuit of the reversing switch winding of said second pair previously selected, connections whereby the closing of one of said second pair of reversing switches short circuits the winding of one of said accelerating switches whereby said accelerating switch closes after a predetermined time interval to short circuit a section of said resistance and also the winding of the next accelerating switch to operate.

3. The combination with a motor, of a starting resistance therefor, a plurality of normally closed accelerating switches for respectively short circuiting sections of said resistance, an operating winding for each of said switches arranged when short circuited to give a predetermined time interval in the closing of its respective switch, two pairs of reversing switches for said motor, manually operated switching means for selectively controlling the closing of at least one reversing switch of each pair for forward or reverse operation of said motor, means controlled by the closing of at least one reversing switch of each pair for short circuiting the winding of one of said accelerating switches whereby said accelerating switch closes after a predetermined time interval, and connections for the winding of another of said accelerating switches whereby said winding is short circuited by the closing of said first accelerating switch.

4. The combination with a motor, of a starting resistance therefor, a plurality of normally closed accelerating switches for respectively short circuiting sections of said resistance, an operating winding for each of said switches arranged when short circuited to give a predetermined time interval in the closing of its respective switch, two pairs of reversing switches for said motor, manually operated switching means for selectively closing at least one reversing switch of each pair for forward or reverse operation of said motor, connections whereby the closing of at least one of said reversing switches energizes the windings of said accelerating switches to open said accelerating switches, means operated by the opening of said accelerating switches for closing the circuit of the motor and for short circuiting the winding of one of said accelerating switches whereby said one accelerating switch closes after a predetermined interval, and connections for the winding of another of said accelerating switches whereby said winding is short circuited by the closing of said one accelerating switch.

GEORGE B. STARIE.